United States Patent
Kuramochi et al.

(10) Patent No.: US 6,347,274 B2
(45) Date of Patent: Feb. 12, 2002

(54) VEHICULAR TRAVEL CONTROL SYSTEM

(75) Inventors: Yuichi Kuramochi, Hitachinaka; Tatsuya Yoshida, Urizura-machi; Shinichi Sakamoto, Aomori; Taisetsu Tanimichi; Yasufumi Konishi, both of Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,428

(22) Filed: Feb. 27, 2001

(30) Foreign Application Priority Data

Feb. 28, 2000 (JP) ........................................ 2000-051032

(51) Int. Cl.⁷ ............................................... G05G 19/00
(52) U.S. Cl. ............................ 701/96; 701/300; 342/70
(58) Field of Search ........................ 701/96, 300, 301; 180/178, 179, 169, 168, 167; 340/903, 904, 906, 435; 342/70, 71

(56) References Cited

U.S. PATENT DOCUMENTS 6,269,306 B1 * 7/2001 Kodaka et al. ............. 701/300
6,282,483 B1 * 8/2001 Yano et al. ................. 340/435
6,292,737 B1 * 9/2001 Higashimato et al. ........ 701/96

FOREIGN PATENT DOCUMENTS

JP    2-40798    2/1990

* cited by examiner

Primary Examiner—Richard M. Camby
(74) Attorney, Agent, or Firm—Crowell & Moring LLP

(57) ABSTRACT

A vehicular travel control system performs automatic follow-up control for maintaining a following distance matching with drivability which a driver may feel. The system detects size of a leading vehicle and insolation around the own vehicle. An appropriate following distance deriving means derives the appropriate following distance so that the appropriate following distance becomes longer when the size of the leading vehicle detected by the vehicle size detecting means is large and the appropriate following distance becomes longer at higher brightness detected by the insolation detecting means.

3 Claims, 7 Drawing Sheets

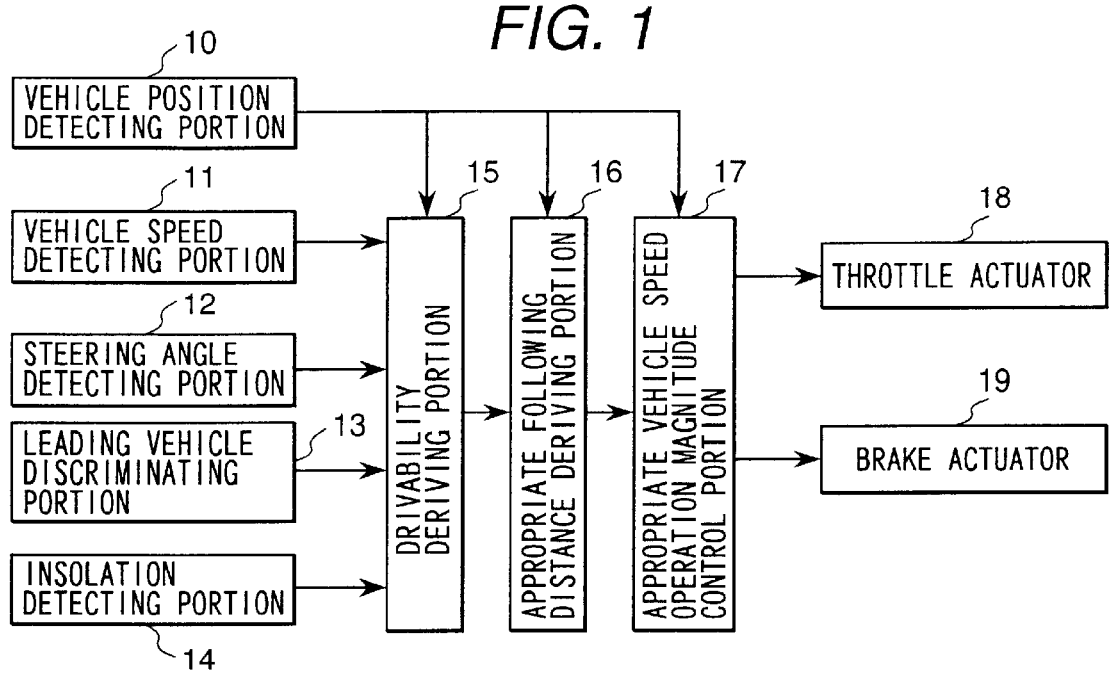

FOLLOWING VEHICLE SPEED (km/h)

RELATIVE SPEED (km/h)

STEERING ANGLE (deg)

LEADING VEHICLE KIND (VEHICLE HEIGHT (m))

FIG. 10

| FOLLOWING VEHICLE SPEED | RELATIVE SPEED | VEHICLE DISTANCE | RELATIVE POSITION | STEERING ANGLE | LEADING VEHICLE KIND | INSOLATION RATE | DRIVABILITY |
|---|---|---|---|---|---|---|---|
| B | N | S | N | N | B | D | VL |
| B | N | S | N | N | B | D | L |
| B | N | S | N | N | B | D | L |
| -------- | -------- | -------- | -------- | -------- | -------- | -------- | -------- |
| M | N | S | L | L | S | D | L |
| -------- | -------- | -------- | -------- | -------- | -------- | -------- | -------- |
| N | P | B | — | N | S | B | VH |

※

VEHICULAR TRAVEL CONTROL SYSTEM

BACKGROUND OF THE INVENTION

The present invention relates to a vehicular travel control system for performing automatic follow-up control for controlling own vehicle to follow-up a leading vehicle.

Conventionally, as a vehicular travel control system for performing automatic follow-up control for controlling own vehicle to follow-up a leading vehicle, it has been known a system for controlling travel of own vehicle for maintaining a following distance between the leading vehicle and the own vehicle at a preliminarily set following distance.

In such vehicular travel control system, when the leading vehicle is changed from a light or small-size vehicle to a heavy truck, the following distance between the leading vehicle and the own vehicle can be maintained constant unless a driver varies a set following distance value.

Therefore, when the following distance is set adapting to the case where the leading vehicle is light vehicle, and if the leading vehicle becomes the heavy truck, forward sight can be degraded to cause difficulty in comfortable drive.

Therefore, in the technology disclosed in Japanese Patent Application Laid-Open No. 2-40798 (1990), judgment is made whether the leading vehicle is a large size vehicle. If judgment is made that the leading vehicle is the large size vehicle, travel of own vehicle is controlled to provide longer following distance.

However, adequacy of the following distance which the driver feel, namely drivability representing adequacy of the current driving condition, such as easiness and sense of security which the driver feel, is not determined only by the kind of the leading vehicle. Namely, when a following vehicle which is own vehicle, is a standard passenger vehicle and the leading vehicle is the heavy truck, the driver of the standard passenger vehicle may feel that the following distance is shorter than that felt when the leading vehicle is the standard passenger vehicle even when the following distance is 5 m, for example. Conversely, when the leading vehicle is the standard passenger vehicle and the own vehicle as following vehicle is the heavy truck, the following distance can be felt longer than that felt when the leading vehicle is the heavy truck even when the following distance is 5 m, for example. Namely, even with the combination of the leading vehicle and the own vehicle as the following vehicle, the drivability to be felt by the driver of the own vehicle as following vehicle can be differentiate significantly.

Also, even by brightness of the environment, the drivability which the driver may feel at the following distance, becomes different significantly. Namely, in day and night, even when the following distance to the leading vehicle is the same, the following distance which the driver may feel, becomes different. That is, in the night where a field of vision is unclear, the following distance that the driver may feel, may be felt shorter.

On the other hand, similarly, even depending upon a traveling speed of the own vehicle, a relative speed relative to the leading vehicle, a relative position, a steering angle of the own vehicle and so forth, the drivability which the driver of the following vehicle may feel, becomes difference even when the following distance to the leading vehicle is the same.

It should be noted that as collection of results of research relating to a field of vision in driving, there is Surveillance Study Report relating to Following Distance (Following Time) of Commercial Vehicle, issued by Association of Electronic Technology for Automobile Traffic and Driving (March, 1999).

SUMMARY OF THE INVENTION

Therefore, an object of the present invention is to provide a vehicular travel control system which can perform automatic follow-up control for maintaining a following distance matching with drivability which a driver may feel.

According to the first aspect of the present invention, a vehicular travel control system comprises:

vehicle size detecting means for detecting size of a leading vehicle;

following distance detecting means for detecting following distance between a leading vehicle and an own vehicle;

insolation detecting means for detecting insolation around the own vehicle;

appropriate following distance calculating means for calculating an appropriate following distance;

travel control means for controlling travel of the own vehicle so that a following distance between the leading vehicle and the own vehicle detected by the following distance detecting means becomes an appropriate following distance derived by the appropriate following distance calculating means, the appropriate following distance deriving means deriving the appropriate following distance so that the appropriate following distance becomes longer when the size of the leading vehicle detected by the vehicle size detecting means is large and the appropriate following distance becomes longer at higher brightness detected by the insolation detecting means.

According to the second aspect of the present invention, a vehicular travel control system comprises:

vehicle size detecting means for detecting size of a leading vehicle;

following distance detecting means for detecting following distance between a leading vehicle and an own vehicle;

speed detecting means for detecting a traveling speed as speed of own vehicle;

relative speed detecting means for detecting a relative speed of own vehicle relative to the leading vehicle;

relative position detecting means for detecting a relative position of the own vehicle relative to the leading vehicle;

steering angle detecting means for detecting a steering angle of the own vehicle;

insolation detecting means for detecting insolation around the own vehicle;

appropriate following distance calculating means for calculating an appropriate following distance;

travel control means for controlling travel of the own vehicle so that a following distance between the leading vehicle and the own vehicle detected by the following distance detecting means becomes an appropriate following distance derived by the appropriate following distance calculating means, the appropriate following distance calculating means evaluating the size of the leading vehicle detected by the vehicle size detecting means, the steering angle detected by the steering angle detecting means, the insolation detected by the insolation detecting means, the traveling speed detected by the speed detecting means, the following distance detected by the following distance detecting means, the relative speed detected by the relative speed detecting means, the relative position detected by the relative position detecting means according to a preliminarily determined evaluation functions for deriving a current drivability as a result of evaluation and correcting the appropriate following distance derived depending upon the drivability.

According to a third aspect of the present invention, a vehicular travel control method for controlling a following distance between a leading vehicle and an own vehicle comprises:

first step of detecting a size of the leading vehicle, the following distance between the leading vehicle and the own vehicle and an insolation around the own vehicle;

second step of deriving an appropriate following distance to be longer at greater size of the leading vehicle detected at the first step and to be longer at higher brightness detected at the first step; and third step of controlling travel of the own vehicle so that the following distance between the leading vehicle and the own vehicle detected at the first step becomes the appropriate following distance derived at the second step.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 1 is a block diagram showing a construction of one embodiment of a vehicular travel control system according to the present invention;

FIG. 2 is an illustration showing an evaluation standard of an input parameter in a drivability calculating portion 15 shown in FIG. 1 and an output value;

FIG. 10 is an illustration showing a control map to be used in a drivability calculating portion 15 shown in FIG. 1;

FIG. 12 is an illustration showing an example of a proper following distance determined and controlled depending upon size of the leading vehicle and insolation in the shown embodiment.

DETAILED DESCRIPTION OF THE PREFERRED EMBODIMENT

Figure 3:
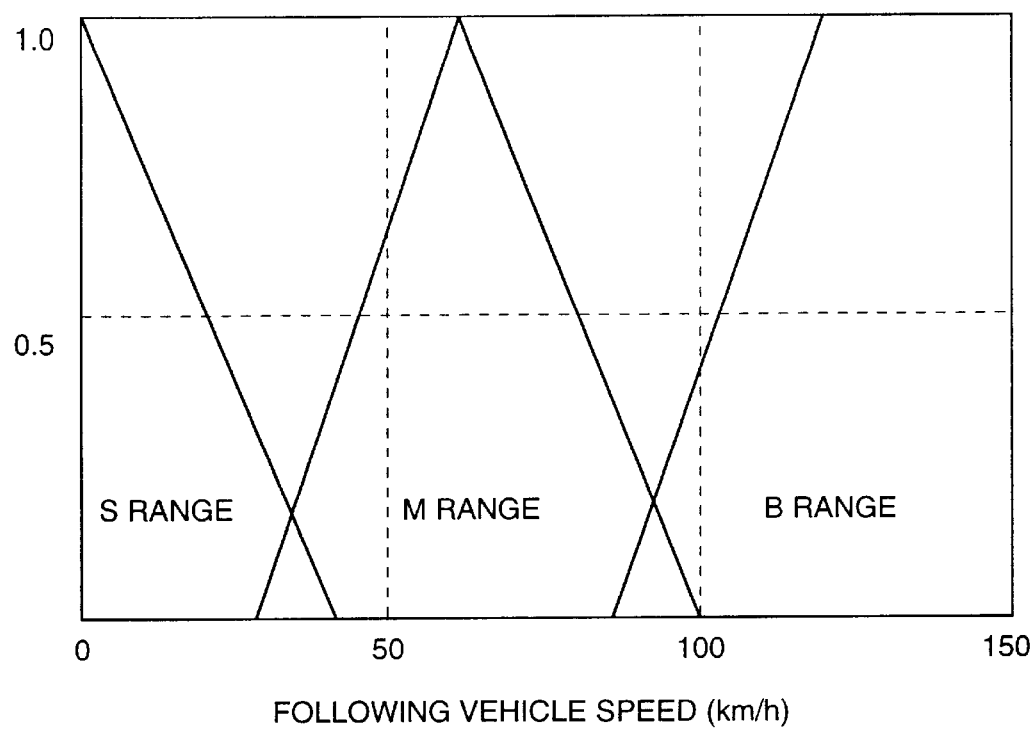
FIG. 3 is an illustration showing an evaluation function of an evaluation standard of a follow-up vehicle speed.

The present invention will be discussed hereinafter in detail in terms of the preferred embodiment of a vehicular travel control system according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

FIG. 1 shows a construction of one embodiment of a vehicular travel control system according to the present invention.

In FIG. 1, a vehicle position detecting portion 10 mounted on an own vehicle (following vehicle) has a laser radar, for example, for scanning front side of the own vehicle with irradiating a laser beam at a predetermined pulse interval. The scanned laser beam is reflected by a leading vehicle. The vehicle position detecting portion 10 detects a following distance, a relative speed and a relative position representative of deviation of traveling directions of the leading vehicle and the own vehicle by receiving the reflected laser beam.

On the other hand, a vehicle speed detecting portion 11 detects a traveling speed of the own vehicle using a Hall element or the like. A steering angle detecting portion 13 detects a steering angle of the own vehicle using a potentiometer or the like.

On the other hand, a leading vehicle discriminating portion 13 processes an image picked-up by a camera or other image pick-up device for discriminating whether the leading vehicle is a large size vehicle or a standard size vehicle. As a criterion for discrimination, comparison of a projection area by the image pick-up device, size of a number plate, color and so forth can be used.

On the other hand, an insolation detecting portion 14 detects an insolation as a parameter representative of brightness of driving view field using a photodiode or the like. It should be noted that when a camera is used in the leading vehicle discriminating portion 13, the insolation is detected with reference to a correction value of exposure of the camera.

The following distance, the relative speed, the relative position, the own vehicle speed, the steering angle, the kind of the leading vehicle and the insolation detected by the vehicle position detecting portion 10, the vehicle speed detecting portion 11, the steering angle detecting portion 12, the leading vehicle discriminating portion 13 and the insolation detecting portion 14 are fed to a drivability calculating portion 15.

The drivability calculating portion 15 performs arithmetic process for respective of input parameters to derive a drivability indicia matching with the feeling of the driver.

Hereinafter, discussion will be given for the arithmetic process of drivability indicia in the drivability calculating portion 15.

As shown in FIG. 2, the drivability calculating portion evaluates the kind of the leading vehicle, the following distance, the relative speed, the relative position and the following vehicle speed as own vehicle speed, the steering angle, the insolation using predetermined evaluation standards to finally output a drivability indicia D depending upon respective results of evaluation.

Namely, a following (own) vehicle speed and the following distance are evaluated by three evaluation standards, i.e. S (Small), M (Middle), B (big), respectively. Relative position and steering angle are evaluated by three evaluation standards, i.e. L (Left), Z (Zero) and R (Right), respectively. The relative speed is evaluated by three evaluation standards, i.e. N (Negative), Z (Zero) and P (Positive). The leading vehicle kind is evaluated by two evaluation standards, i.e. S (Small) and B (Big). The insolation is evaluated by two evaluation standards, i.e. D (Dark) and B (Bright).

Particularly, evaluation functions of respective evaluation standards of the following vehicle speed, the relative speed, the following distance, the relative position, the steering angle, the leading vehicle, and the insolation are shown in FIGS. 3. 4, 5, 6, 7, 8 and 9 are used for deriving conformity of respective parameters of the following distance, the relative position, the steering angle, the leading vehicle, and the insolation.

Figure 4:
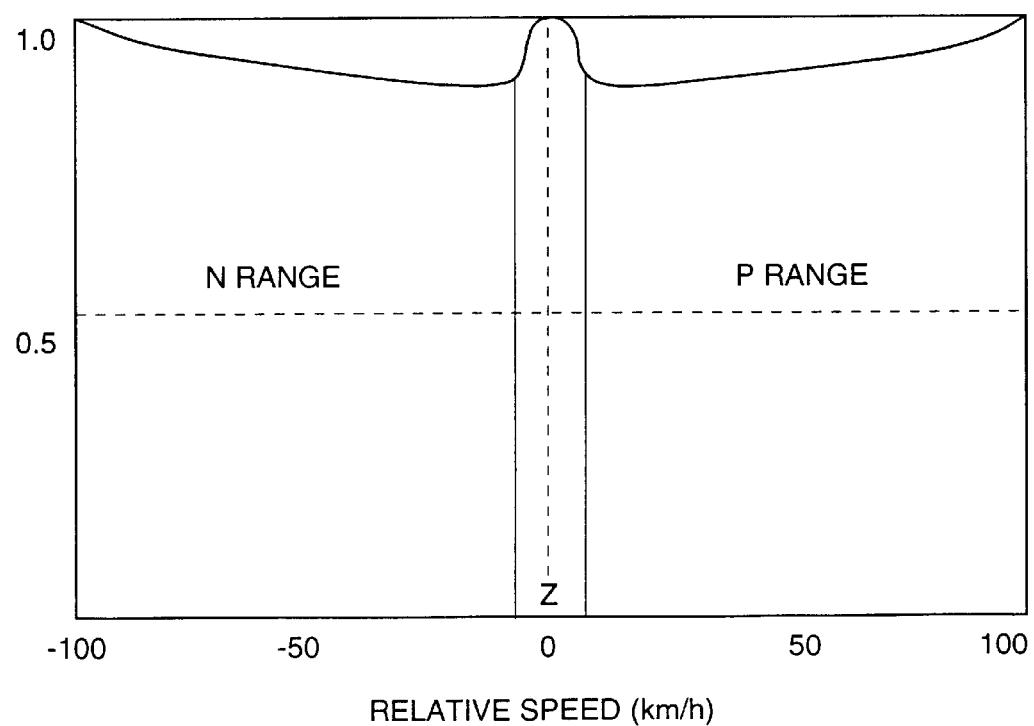
FIG. 4 is an illustration showing an evaluation function of an evaluation standard of a relative speed.
Figure 5:
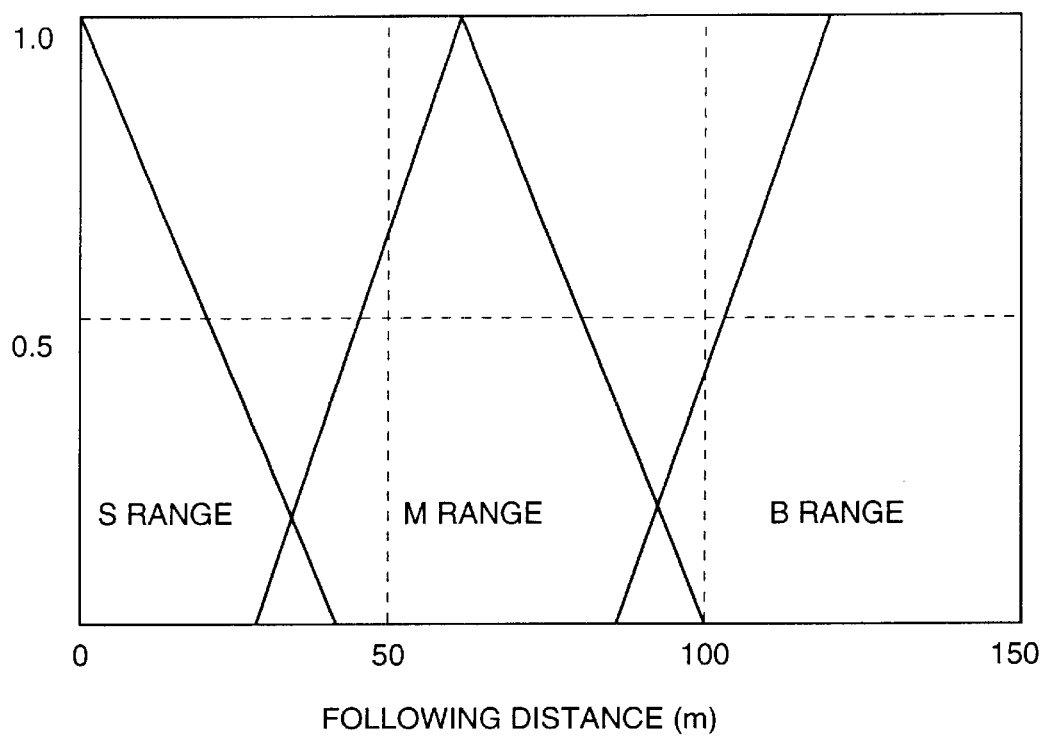
FIG. 5 is an illustration showing an evaluation function of an evaluation standard of a following distance.
Figure 6:
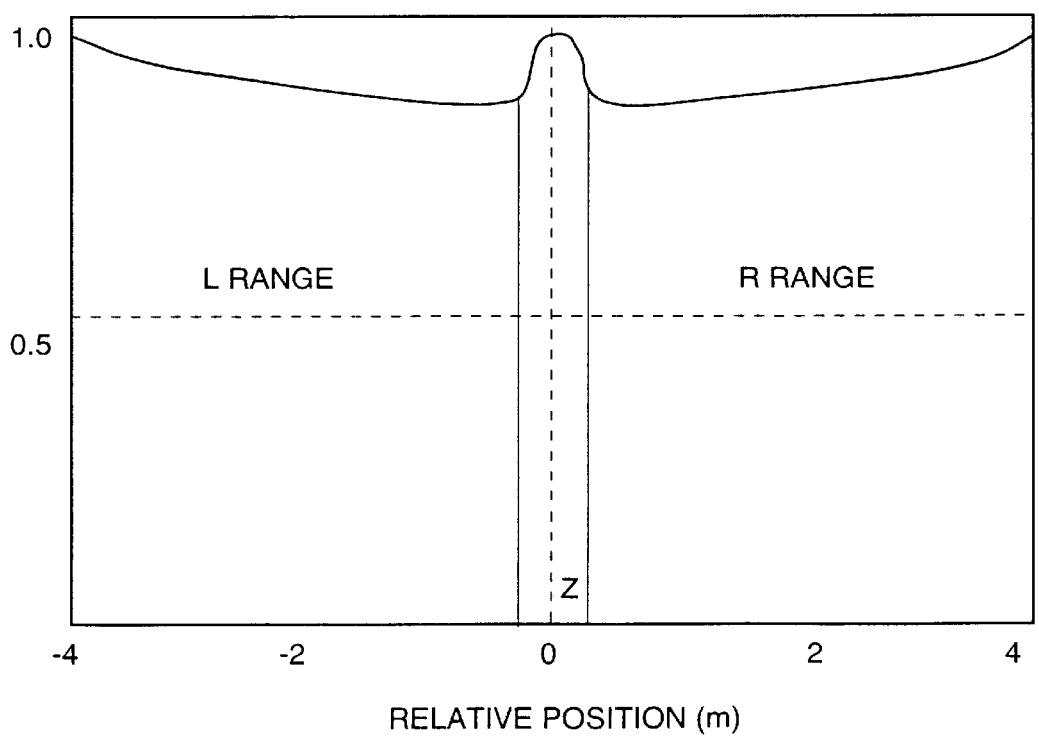
FIG. 6 is an illustration showing an evaluation function of an evaluation standard of a relative position.
Figure 7:
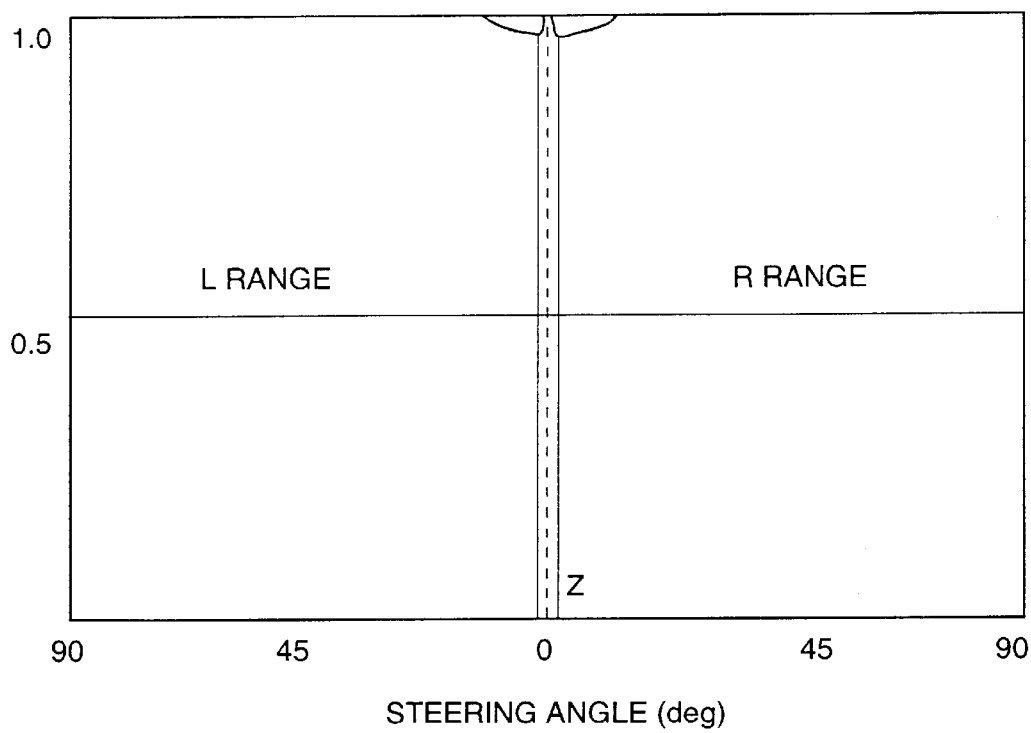
FIG. 7 is an illustration showing an evaluation function of an evaluation standard of a steering angle.
Figure 8:
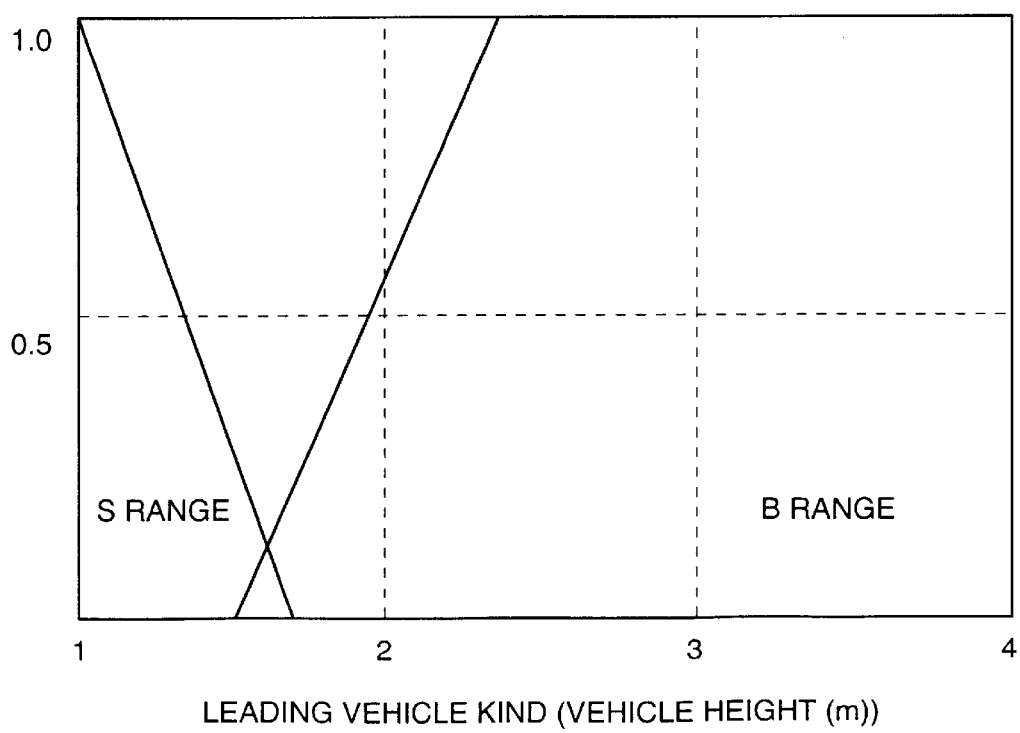
FIG. 8 is an illustration showing an evaluation function of an evaluation standard of a leading vehicle kind.
Figure 9:
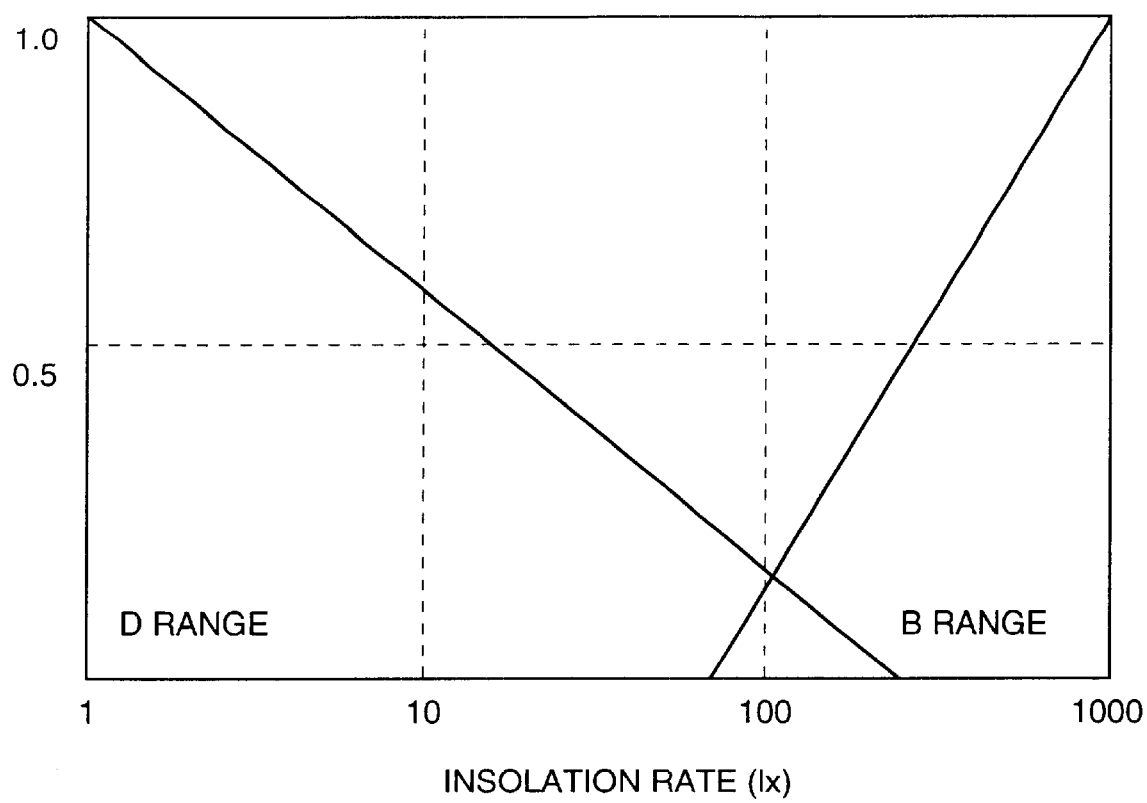
FIG. 9 is an illustration showing an evaluation function of an evaluation standard of an insolation.

Here, FIG. 3 shows the evaluation function of the evaluation standards S (small), M (Middle) and B (Big) of the following vehicle speed. FIG. 4 shows the evaluation function of the evaluation standards N (Negative), Z (Zero) and P (Positive) of the relative speed. FIG. 5 shows the evaluation function of the evaluation standard S (small), M (Middle) and B (Big) of the following distance. FIG. 6 shows the evaluation function of the evaluation standard L (Left), Z (zero) and R (Right) of the relative position. FIG. 7 shows the evaluation function of the evaluation standard L (Left), Z (Zero) and R Right) of steering angle. FIG. 8 shows the evaluation function of the evaluation standard S (Small) and B (Big) of the leading vehicle kind. FIG. 9 shows the evaluation function of the evaluation standards D (Dark) and B (Bright) of the insolation. Here, FIG. 8 shows the case where the vehicular height of the leading vehicle is used as the leading vehicle kind.

By using the evaluation functions, conformity to respective evaluation standard corresponding to respective parameters are derived. For example, when evaluation function of the evaluation standards of S (Small), M (Middle) and B (Big) of the following vehicle shown in FIG. 3 is used, degree of respective evaluation standards at 50 Km/h of the following vehicle speed are as follows:

S (Small)=0
M (Middle)=0.6
B (Big)=0

This indicates that when the vehicle speed of the own vehicle as the following vehicle is 50 Km/h, in the driver's feeling, it is judged that the vehicle speed of 50 Km/h conforms with the evaluation standard M (Middle speed) in conformity of 0.6.

In the similar manner, the drivability deriving portion 15 derives the conformity of respective evaluation standards corresponding to respective parameters of the following vehicle speed, the relative speed, the following distance, the relative position, the steering angle, the leading vehicle, the insolation As a result, when respective parameters of the following vehicle speed, the relative speed, the following distance, the relative position, the steering angle, the leading vehicle, the insolation are:
following vehicle speed=80 Km/h
relative speed=−20 Km/h
following distance=25 m
relative position=−2 m
steering angle=−45°
leading vehicle=1.5 m (vehicular height)
insolation=101×
the conformity of respective evaluation standards corresponding to respective parameters is as follows:
(1) following vehicle speed
S=B=0
M=0.35
(2) relative speed
p=Z=0
N=0.9
(3) following distance
S=0.4
M=B=0
(4) relative position
R=0
L=0.9
(5) steering angle
L=1.0
R=0
(6) leading vehicle
S=0.3
B=0
(7) insolation
D=0.6
B=0

Then, the drivability calculating portion 15 finally derives the drivability indicia in the following manner using a control map shown in FIG. 10.

FIG. 10 shows the control map preliminarily defining correspondence between a combination of the following vehicle speed, the relative speed, the following distance, the relative position, the steering angle, the leading vehicle, the insolation and five evaluation standards, i.e. VL (Very Low), L (Low), M (Middle), H (High) and VH (Very High) of a drivability indicia D and expresses drivability which the driver should feel with respect to a combination of the following vehicle speed, the relative speed, the following distance, the relative position, the steering angle, the leading vehicle, the insolation as a relational rule of respective evaluation standard.

For example, a first line of the control map shows a rule "when the following vehicle speed is B (Big), the relative speed is N (Negative), the following distance is S (Small), the relative position is Z (Zero), the steering angle is Z (Zero), the leading vehicle is B (Big) and the insulation is S (Dark), the drivability indicia is VL (Very Low)". A third line of the control map shows a rule "when the following vehicle speed is B (Big), the relative speed is N (Negative), the following distance is S (Small), the relative position is Z (Zero), the steering angle is Z (Zero), the leading vehicle is B (Big) and the insulation is B (Bright), the drivability indicia is L (Low)".

Using the control map, the drivability calculating portion 15 derives satisfaction rate of each rule (each line) of respective control map is derived from a product of conformity derived preliminarily with respect to the following vehicle speed, the relative speed, the following distance, the relative position, the steering angle, the leading vehicle, the insolation described in the rules.

Namely, for example, with respect to the rule added * in the control map, with the evaluation functions of respective parameters shown in FIGS. 3 to 9, when respective conformity is derived as:
conformity of following vehicle speed being M=0.35
conformity of relative speed being N=0.9
conformity of following distance being S=0.4 conformity of relative position being L=0.9
conformity of steering angle being L=1.0
conformity of leading vehicle being S=0.3 and
conformity of insolation being S=0
the satisfaction rate of the rule added * is derived by the product of these conformities 0.35×0.9×0.4×0.9×1.0×0.3×0=0

Once the satisfaction rate with respect to respective rule of the control map is derived, assuming that the satisfaction rate of the (i)th rule is Si, the evaluation standard of the drivability indicia described in the (i)th rule is Ui, and with replacing predetermined values for respective of five evaluation standards VL, L, M, H and VH if the drivability indicia D, e.g. VL=1.00, L=0.75, M=0.50, H=0.25 and VH=0.00, the final drivability indicia D is calculated from:

$$D = \Sigma(Si \times Ui)/\Sigma Si$$

The drivability indicia D derived by the drivability calculating portion 15 as set forth above is fed to an appropriate following distance calculating portion 16.

The appropriate following distance calculating portion 16 derives an appropriate following distance between the leading vehicle and the own vehicle using the drivability indicia D received from the drivability calculating portion 15, the relative speed from the vehicle position detecting portion 10 and the following vehicle speed from the vehicle speed detecting portion 11.

Namely, at first, by the relative speed Vr and the own vehicle speed V, a reference following distance Lo for stopping the own vehicle without causing rear-end collision to the leading vehicle is derived according to the following expression:

$$Lo = V \times \tau + (Vs^2 - V^2)/2\alpha$$

$$Vs = V + Vr$$

Here, τ is a free run time of own vehicle (a pweriod from depression of the brake to actual actuation of the brake), α is deceleration. Then, using the drivability indicia D derived by the drivability calculating portion 15, the reference following distance Lo is corrected to derive an appropriate following distance L by the following expression.

$$L = (1+D) \times Lo$$

Then, the appropriate following distance calculating portion 16 feeds the derived appropriate following distance L to an appropriate vehicle speed operation magnitude control portion 17.

Figure 11:
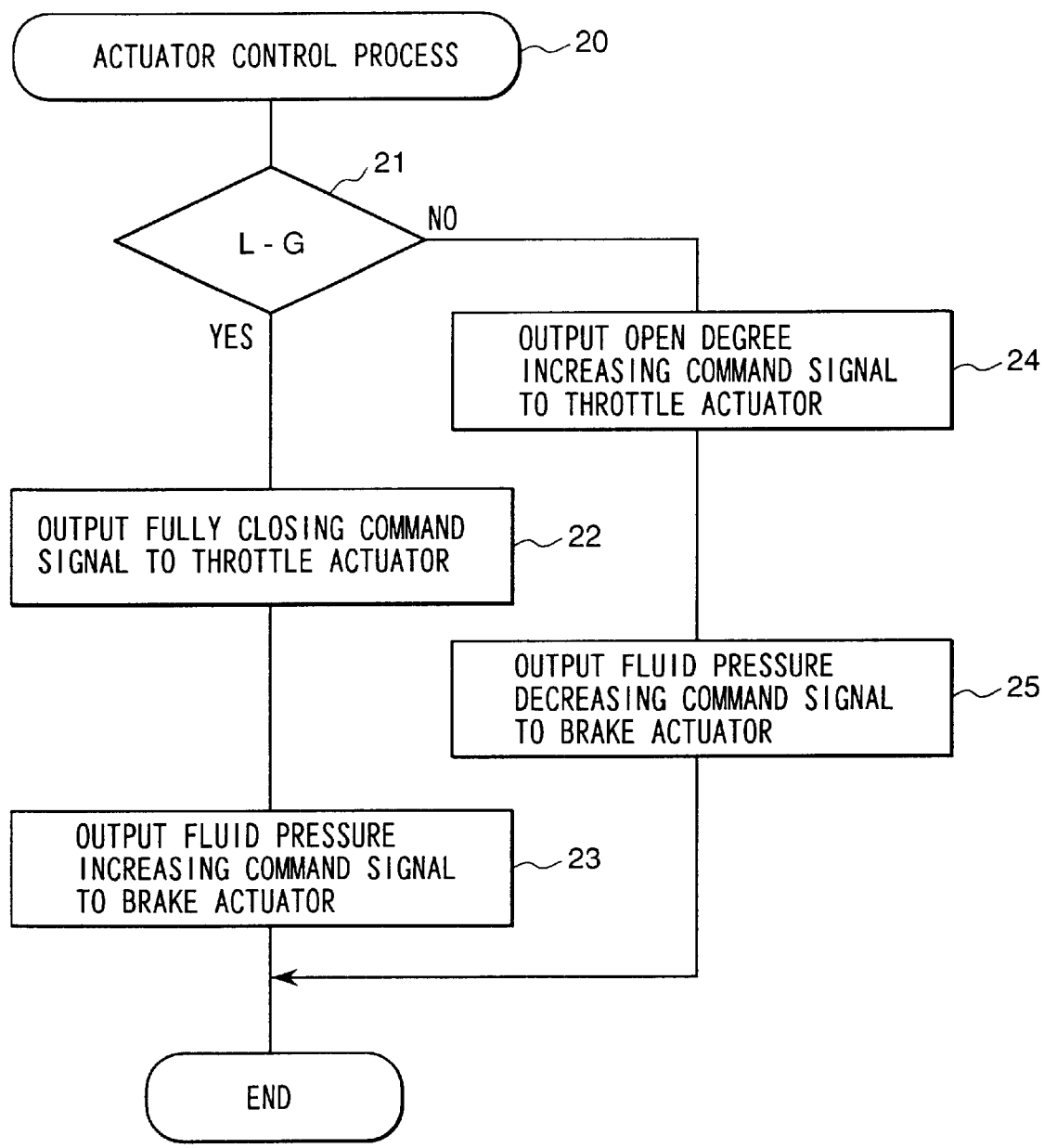
FIG. 11 is an illustration showing a process in a proper vehicle speed operation amount control portion 17 shown in FIG. 1.

The appropriate vehicle speed operation magnitude control 17 receiving the appropriate following distance L performs process shown in FIG. 11.

Namely, in a process at step 21, calculation of L−G is performed with the appropriate following distance L and an actual following distance G. If the result of calculation is positive, it means that the actual following distance G is shorter than the appropriate following distance L. Then, by a process at step 22, a throttle valve actuator 18 is actuated to place a throttle valve at fully closed position to apply an engine brake to the vehicle. In conjunction therewith, in a process at step 23, a brake actuator 19 is actuated for increasing a braking fluid pressure to apply a brake for decelerating the vehicle speed for controlling the following distance G to the appropriate following distance L.

On the other hand, if the result of calculation in the process at step 21 is negative, it means that the actual following distance G is longer than the appropriate following distance L. Then, in a process at step 24, the throttle actuator 18 is actuated to increase open degree of the throttle valve. In conjunction therewith, in a process at step 25, the brake actuator 19 is actuated to decrease the braking fluid pressure to increase the vehicle speed for controlling the actual following distance G toward the appropriate following distance L.

As set forth above, in the shown embodiment, the vehicle speed of the following vehicle, the relative speed to the leading vehicle, the following distance, the relative position, the steering angle of the own vehicle, the size of the leading vehicle and the insolation are taken into account for evaluating the drivability to control the following distance depending upon the evaluated drivability. Therefore, by defining an appropriate content of control depending upon the result of evaluation, the following distance can be controlled to attain appropriate drivability.

As a result, it becomes possible to control vehicular travel depending upon the size of the leading vehicle and the insulation in such a manner that when the size of the leading vehicle is large and the insolation is low, the following distance becomes greater than standard, when the size of the leading vehicle is large and the insulation is high, the following distance is medium, when the size of the leading vehicle is small and the insulation is low, the following distance is medium, and when the size of the leading vehicle is small and the insulation is high, the following distance is small.

As set forth above, according to the present invention, it becomes possible to perform automatic follow-up control depending upon the following distance adapting to drivability which the driver may feel.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A vehicular travel control system comprising:
   vehicle size detecting means for detecting size of a leading vehicle;
   following distance detecting means for detecting following distance between a leading vehicle and an own vehicle;
   insolation detecting means for detecting insolation around the own vehicle;
   appropriate following distance calculating means for calculating an appropriate following distance;
   travel control means for controlling travel of the own vehicle so that a following distance between said leading vehicle and the own vehicle detected by said following distance detecting means becomes an appropriate following distance derived by said appropriate following distance calculating means,
   said appropriate following distance deriving means deriving said appropriate following distance so that said appropriate following distance becomes longer when the size of the leading vehicle detected by said vehicle size detecting means is large and said appropriate following distance becomes longer at higher brightness detected by said insolation detecting means.

2. A vehicular travel control system comprising:

vehicle size detecting means for detecting size of a leading vehicle;

following distance detecting means for detecting following distance between a leading vehicle and an own vehicle;

speed detecting means for detecting a traveling speed as speed of own vehicle;

relative speed detecting means for detecting a relative speed of own vehicle relative to the leading vehicle;

relative position detecting means for detecting a relative position of the said own vehicle relative to said leading vehicle;

steering angle detecting means for detecting a steering angle of said own vehicle insolation detecting means for detecting insolation around the own vehicle;

appropriate following distance calculating means for calculating an appropriate following distance;

travel control means for controlling travel of the own vehicle so that a following distance between said leading vehicle and the own vehicle detected by said following distance detecting means becomes an appropriate following distance derived by said appropriate following distance calculating means, said appropriate following distance calculating means evaluating the size of the leading vehicle detected by said vehicle size detecting means, the steering angle detected by said steering angle detecting means, the insulation detected by said insolation detecting means, the traveling speed detected by said speed detecting means, the following distance detected by said following distance detecting means, the relative speed detected by said relative speed detecting means, the relative position detected by said relative position detecting means according to a preliminarily determined evaluation functions for deriving a current drivability as a result of evaluation and correcting said appropriate following distance derived depending upon the drivability.

3. A vehicular travel control method for controlling a following distance between a leading vehicle and an own vehicle comprising:

first step of detecting a size of the leading vehicle, the following distance between said leading vehicle and the own vehicle and an insolation around the own vehicle;

second step of deriving an appropriate following distance to be longer at greater size of the leading vehicle detected at said first step and to be longer at higher brightness detected at said first step; and third step of controlling travel of the own vehicle so that the following distance between said leading vehicle and the own vehicle detected at said first step becomes the appropriate following distance derived at said second step.

* * * * *